United States Patent [19]

Boultinghouse

[11] 4,237,156

[45] Dec. 2, 1980

[54] FLUORINATED POLY(ARYLENE SULFIDES)

[75] Inventor: Harold D. Boultinghouse, Bartlesville, Okla.

[73] Assignee: Phillips Petroleum Company, Bartlesville, Okla.

[21] Appl. No.: 961,896

[22] Filed: Nov. 17, 1978

[51] Int. Cl.² .......................... B32B 27/06; B05D 3/04
[52] U.S. Cl. .................. 427/255.1; 427/322; 427/402; 428/411; 428/419; 528/388; 427/248.1, 255.4
[58] Field of Search ............... 528/388; 428/411, 419, 428/421; 427/248 E, 248 A, 322, 248 B, 248 R, 402

[56] References Cited

U.S. PATENT DOCUMENTS

| | | | |
|---|---|---|---|
| 2,829,070 | 4/1958 | Osborn | 428/480 |
| 3,255,099 | 6/1966 | Wolinski | 264/22 |
| 3,354,129 | 11/1967 | Edmonds, Jr. | 528/265 |
| 3,364,056 | 1/1968 | Seibel | 427/223 |
| 3,647,613 | 3/1972 | Scotland | 220/457 |
| 3,758,450 | 9/1973 | Margrave et al. | 528/483 |
| 3,862,284 | 1/1975 | Dixon et al. | 264/83 |
| 3,919,177 | 11/1975 | Campbell | 528/373 |
| 3,953,653 | 4/1976 | Doss | 428/419 |
| 4,011,121 | 3/1977 | Doss | 156/82 |
| 4,020,223 | 4/1977 | Dixon et al. | 428/421 X |
| 4,064,115 | 12/1977 | Stapp et al. | 528/388 |

Primary Examiner—Lorraine T. Kendell

[57] ABSTRACT

Surfaces of articles formed from poly(arylene sulfide) resins are conditioned for the reception of adhesives, coatings, paints, and the like by contact with a fluorine-containing gas under conditions and for a period of time sufficient to render the surface water-wettable. The fluorine-containing gas can be pure or admixed with up to about 99 volume percent inert gas.

6 Claims, No Drawings

FLUORINATED POLY(ARYLENE SULFIDES)

This invention relates to the treatment of poly(arylene sulfide) resin surfaces. In accordance with another aspect, this invention relates to a process for the fluorination of poly(arylene sulfide) resin surfaces. In accordance with another aspect, this invention relates to a process for treating the surfaces of articles formed from poly(arylene sulfide) resins with a fluorine-containing gas to render the surface water-wettable. In accordance with a further aspect, this invention relates to articles formed from poly(arylene sulfide) resins having surfaces receptive to adhesives, coatings, paints, and the like comprising fluorinated poly(arylene sulfide) surfaces.

One of the most promising resins developed in recent years is poly(arylene sulfide). This resin exhibits astonishing properties in its behavior against chemicals, as well as in its thermal properties. In addition, this resin has mechanical properties heretofore unknown for polymer materials. In accordance with the invention, a process is provided for producing arylene sulfide polymers that are receptive to adhesives, coatings, paints, and the like.

An object of this invention is to provide a process for the treatment of poly(arylene sulfide) surfaces.

A further object of this invention is to provide a poly(arylene sulfide) surface receptive to a second material.

A further object of this invention is to provide a process for treating surfaces of chemically inert poly(arylene sulfides) to render the surfaces receptive to a second material.

Other objects and aspects, as well as the several advantages of the invention, will become apparent to those skilled in the art from the following detailed description of the invention, examples, and the appended claims.

In accordance with the invention, a process is provided for treating a poly(arylene sulfide) surface which comprises contacting said surface with a fluorine-containing gas under conditions and for a period of time sufficient to render the surface water-wettable.

Further, in accordance with the invention, polymer compositions receptive to a second material such as adhesives, coatings, paints, and the like are provided comprising fluorinated poly(arylene sulfide) surfaces.

In a preferred embodiment of the invention, articles formed from poly(phenylene sulfide) resins are rendered receptive to adhesives, coatings, paints, and the like by conditioning the articles in an ambient comprising fluorine.

The poly(arylene sulfide) employed in accordance with this invention comprises a resin known in the art and containing repeating groups such as -aryl-S-. Suitable arylene sulfide polymers and their manner of preparation are disclosed in Phillips Petroleum Company Patents 3,354,129, which issued Nov. 21, 1967, to J. T. Edmonds, Jr. and H. W. Hill, Jr., and U.S. Pat. No. 3,919,177, which issued Nov. 11, 1975, to R. W. Campbell. A particularly preferred polymer is poly(phenylene sulfide), hereinafter abbreviated and convenience as PPS. Suitable polymers of this class have a melt flow (ASTM D 1238-70, modified to a temperature of 316° C. and using a 5-kg weight, value expressed as g/10 minutes) ranging from about 10 to about 700. Polymers having a melt flow in this range can be prepared directly according to the procedures disclosed in U.S. Pat. No. 3,919,177. Polymers prepared as disclosed in U.S. Pat. No. 3,354,129 generally have melt flows in excess of 700, e.g., about 4,000. Such polymers can be partially cured through crosslinking and/or chain extension, for example, by heating at temperatures up to about 480° C. in the presence of a gas containing molecular oxygen to decrease their high initial melt flow into the desired range.

PPS can be blended with various additives such as extenders, fillers, pigments, processing aids, stabilizers, other polymers, and the like to produce a variety of compositions. PPS or PPS-containing compositions can be converted into molded articles, fibers, films, etc., by employing conventional fabricating equipment such as extruders, blow molders, thermoformers, injection molders, and the like.

The poly(arylene sulfide) surfaces can be on solid objects molded from poly(arylene sulfide), on objects coated with poly(arylene sulfide), on laminates of poly(arylene sulfide) with solid materials such as fiberglass, fabric, cloth, etc., or articles made from poly(arylene sulfide) which are either unfilled or filled with chopped fiberglass, as well as on any other suitable type of material possessing a cured or uncured poly(arylene sulfide) surface. The presently preferred polymer is the poly(p-phenylene sulfide) resin either unfilled or filled with about 5 to about 60 weight percent of chopped glass fibers.

In practicing the invention a shaped PPS article is exposed to fluorine gas alone or in combination with a gas inert in the process such as nitrogen or helium, preferably nitrogen because of its relatively low cost. The amount of inert gas employed can range from zero to about 99 volume percent. Ordinarily, the amount of inert gas employed ranges from about 10 to about 99 volume percent. One aspect of diluting fluorine gas with an inert gas is to increase the reaction time needed to achieve the desired effect, e.g., render the exposed PPS surfaces more polar in chemical nature. The treated surfaces, for example, are water-wettable whereas untreated surfaces are not. The polar nature of the treated surfaces renders them more receptive to adhesives, coatings, etc., than the untreated surfaces. Lengthening the reaction time by employing diluted fluorine gas can be advantageous since it enables the operator to more closely regulate the degree of treatment afforded the PPS surfaces.

The reaction time employed at a moderate temperature can range from about 30 seconds to about 30 minutes or longer depending upon the composition of treating gas and the shape of the PPS article. To achieve comparable results, less time is required with pure fluorine than with a composition, for example, consisting of one volume percent fluorine and 99 volume percent nitrogen. Intricately shaped articles and/or hollow articles can require somewhat longer treating times than film, fibers, etc., for example, to be sure that the treating gas contacts all portions of the object sufficiently long to achieve the desired effect. By moderating temperature in this invention is meant temperatures ranging from about 65° C. to about 110° C. Lower temperatures can be employed, if desired, but they can increase the treating time beyond that desired in a commercial venture. Higher temperature can be employed but due to the increased reaction rate that results, a possibility of uncontrollable overtreating becomes more likely.

For purposes of economy and safety, the treating process generally takes place in an enclosed area with means provided to position the molded PPS article(s) within the area. Means are also provided to charge the area with the treating gas, to circulate it, if desired, and to withdraw it for recovery purposes or to safely dispose of it. All fluorine gas is purged from the area, recovered or neutralized, before the treated article(s) are removed. For example, fluorine can be neutralized (removed) by contact with an aqueous solution of sodium carbonate.

EXAMPLE I

Several PPS compositions were prepared and converted into small housings by injection molding. One composition was prepared by blending together 60 weight percent PPS (prepared as in U.S. Pat. No. 3,354,129 and partially cured by heating in air at about 290° C.) and 40 weight percent fiberglass. A typical melt flow for this composition is about 25. The second composition was prepared by blending together 45 weight percent PPS (prepared and partially cured as described above), 20 weight percent fiberglass, and 35 weight percent mineral fillers. A typical melt flow for the second composition is about 15. The housings were cylinders about 0.5 inches (1.3 cm) in diameter and about 3 inches (8 cm) long, having walls about 1/16" (0.16 cm) in thickness. The housings, particularly the interiors, are very difficult to treat by ordinary means to render the surfaces receptive for adherent coatings and the like.

About one-half of the molded samples, preheated to about 180° F. (82° C.), were placed inside a clean, dry steel container, $9 \times 9 \times 14$ inches ($22.9 \times 22.9 \times 35.6$ cm). The container had a hinged opening in the top and a hinged opening in the bottom through which the samples were inserted. The openings were then loosely closed. A valved line connected to a supply of pressurized gas consisting of 10 volume percent fluorine and 90 volume percent nitrogen was attached to the bottom of the container to admit the mixture when desired. The container, now located in a vented hood, had sufficient treating gas admitted to the container to displace the air within it, e.g., about 19 liters at ambient pressure and temperature, after which the valve was closed. After five minutes the hinged doors of the container were opened and the treating gas allowed to vent to the atmosphere. The samples were then recovered.

It was found that the treated samples, both inside and outside, were readily wet with water, indicating polar surfaces had been generated. The untreated control samples did not wet with water. The treated surfaces were receptive to an epoxy-based potting compound used in the electronic industry for encapsulating devices whereas the untreated surfaces were not receptive.

EXAMPLE II

A plaque, measuring $4 \times 8 \times 0.125$ inches ($10 \times 20 \times 0.3$ cm), was injection molded from the 60/40 PPS/fiberglass composition described in Example I. One side of the sample was treated with the 10/90 fluorine/nitrogen mixture in the manner previously described.

It was found that the treated side of the plaque could be wet with water whereas the untreated side could not be wetted.

The treated side of the plaque was contacted with an aqueous solution of stannous chloride as known in the electroless plating art to sensitize the surface for application of an electroless metal coating. Such $SnCl_2$ solutions can contain from about 0.7 to 150 g/l of $SnCl_2$. A contacting time ranging from about 15 to 60 seconds at 25° C. is suitable. After a water rinse the plaque was dipped into a silvering solution and held there for about ten minutes, then removed, rinsed in water, and dried. It was found one side of the plaque treated sequentially with the fluorine/nitrogen mixture and aqueous stannous chloride could be successfully silvered whereas the untreated side could not be. A suitable silvering solution, for example, can consist of equal portions of solution A containing about 9.6 g/l of silver nitrate and about 4.4 g ammonia as ammonium hydroxide and solution B containing about 19.2 g/l of hydrazine sulfate and about 4.8 g/l of sodium hydroxide.

This example demonstrates that fluorine-treated PPS articles can be metallized using chemical precipitation of metal films. It is believed that the treated surfaces can also be metallized by vacuum deposition.

It is envisioned that large scale fluorination of molded or shaped PPS articles can be carried out by attaching each article to a conveyor, for example, which is continuously passed downwardly into and through a chamber filled with the fluorine-containing ambient. The conveyor with the treated articles then rises out of the treating chamber and through a purge area, if desired, to remove any fluorine that may be present.

Fluorine itself is heavier than air whereas nitrogen is slightly lighter than air and helium is substantially lighter than air. To conduct the operation envisioned above, it is calculated that fluorine itself, a fluorine/nitrogen mixture consisting of at least about ten volume percent fluorine and a fluorine/helium mixture consisting of at least about 75 volume percent fluorine, is needed.

On the other hand, if the conveyed articles are passed upwardly into and through a chamber containing a lighter-than-air mixture of the fluorine gas ambient then different ratios of components can be utilized. For example, it is calculated for fluorine/nitrogen mixtures that the maximum amount of fluorine should be no more than about seven volume percent. For fluorine/helium mixtures, the maximum amount of fluorine should be no more than about 70 volume percent.

I claim:

1. A process for treating a poly(arylene sulfide) surface which consists essentially of contacting said surface with a fluorine-containing gas under a temperature and for a period of time sufficient to render said surface water-wettable and receptive to a second material including adhesives, coatings, paints and the like.

2. A process according to claim 1 wherein said poly(arylene sulfide) is poly(arylene sulfide).

3. A process according to claim 1 wherein said poly(arylene sulfide) is a molded or shaped article formed from poly(phenylene sulfide).

4. A process according to claim 1 wherein said fluorine-containing gas is a mixture of inert gas and fluorine containing up to about 99 volume percent inert gas.

5. A process according to claim 1 wherein said temperature ranges from about 65° C. to about 110° C., said period of time ranges from about 30 seconds to about 30 minutes, and said fluorine-containing gas is a mixture of fluorine and nitrogen.

6. A process according to claim 5 wherein said polymer is poly(phenylene sulfide) and said gas is a mixture of about 90 percent nitrogen and about 10 percent fluorine.

* * * * *